United States Patent
Yli-Peltola et al.

(10) Patent No.: US 12,305,092 B2
(45) Date of Patent: May 20, 2025

(54) RECYCLABLE PLASTIC LABEL

(71) Applicant: UPM Raflatac Oy, Tampere (FI)

(72) Inventors: Juha Yli-Peltola, Tampere (FI); Sami Kivinen, Pirkkala (FI)

(73) Assignee: UPM RAFLATAC OY, Tampere (FI)

( * ) Notice: Subject to any disclaimer, the term of this patent is extended or adjusted under 35 U.S.C. 154(b) by 136 days.

(21) Appl. No.: 17/927,172

(22) PCT Filed: May 31, 2021

(86) PCT No.: PCT/FI2021/050391
§ 371 (c)(1),
(2) Date: Nov. 22, 2022

(87) PCT Pub. No.: WO2021/245330
PCT Pub. Date: Dec. 9, 2021

(65) Prior Publication Data
US 2023/0245596 A1    Aug. 3, 2023

(30) Foreign Application Priority Data
Jun. 3, 2020 (FI) ...................................... 20205574

(51) Int. Cl.
*G09F 3/10* (2006.01)
*B29B 9/04* (2006.01)
(Continued)

(52) U.S. Cl.
CPC ................. *C09J 7/381* (2018.01); *B29B 9/04* (2013.01); *B32B 7/06* (2013.01); *B32B 7/12* (2013.01);
(Continued)

(58) Field of Classification Search
CPC .............................................. G09F 2003/0223
See application file for complete search history.

(56) References Cited

U.S. PATENT DOCUMENTS 4,379,525 A * 4/1983 Nowicki ................. B03B 9/061
                                                      241/101.8
4,837,075 A * 6/1989 Dudley ..................... G09F 3/04
                                                       156/240
(Continued)

FOREIGN PATENT DOCUMENTS

CN          1089291 A        7/1994
CN        101684398 A  *     3/2010
(Continued)

OTHER PUBLICATIONS

"Tackifier Products", Functional Products Inc., Mar. 2018; 14 pages.
(Continued)

*Primary Examiner* — Jeffry H Aftergut
(74) *Attorney, Agent, or Firm* — CANTOR COLBURN LLP (57) ABSTRACT

The disclosure relates to a mechanically recyclable label (1) comprising a face (2) and an adhesive (4). The face (2) comprises ethylene containing polymer and the adhesive (4) comprises pressure sensitive adhesive. The pressure sensitive adhesive comprises at least 15 wt. % of a base polymer, at least 25 wt. % of a tackifier and at least 10 wt. % of a plasticizer. The base polymer, the tackifier and the plasticizer are colourless and odourless. The base polymer is a styrene block copolymer. The mechanically recyclable label (1) is mechanically recyclable with packaging material comprising ethylene containing polymer. The disclosure further relates to a label laminate (8), a method for manufacturing a label laminate (8), a labelled item (101), as well as to use of a label (1) and of a label laminate (8). The disclosure also relates to use of a waste matrix of the label laminate for producing granulates of recycled plastic.

11 Claims, 2 Drawing Sheets

(51) Int. Cl.
  *B32B 7/06* (2019.01)
  *B32B 7/12* (2006.01)
  *B32B 27/22* (2006.01)
  *B32B 27/32* (2006.01)
  *C08J 11/06* (2006.01)
  *C08L 23/06* (2006.01)
  *C09J 7/24* (2018.01)
  *C09J 7/38* (2018.01)
  *C09J 11/08* (2006.01)
  *G09F 3/02* (2006.01)

(52) U.S. Cl.
  CPC .............. *B32B 27/22* (2013.01); *B32B 27/32* (2013.01); *C08J 11/06* (2013.01); *C08L 23/06* (2013.01); *C09J 7/243* (2018.01); *C09J 11/08* (2013.01); *G09F 3/02* (2013.01); *G09F 3/10* (2013.01); *B32B 2519/00* (2013.01); *C08J 2323/06* (2013.01); *C08J 2423/08* (2013.01); *C08L 2205/025* (2013.01); *C08L 2207/20* (2013.01); *C09J 2203/334* (2013.01); *C09J 2301/302* (2020.08); *C09J 2301/408* (2020.08); *C09J 2301/414* (2020.08); *C09J 2409/00* (2013.01); *C09J 2423/04* (2013.01); *C09J 2423/046* (2013.01); *C09J 2423/16* (2013.01); *C09J 2453/00* (2013.01); *C09J 2491/00* (2013.01); *C09J 2493/00* (2013.01); *G09F 2003/0223* (2013.01); *G09F 2003/0241* (2013.01)

(56) References Cited

U.S. PATENT DOCUMENTS

| 7,199,180 | B1 | 4/2007 | Simmons et al. |
| 9,982,171 | B2 | 5/2018 | Kanderski et al. |
| 2007/0135563 | A1 | 6/2007 | Simmons et al. |
| 2010/0148127 | A1 | 6/2010 | Ellinger et al. |
| 2016/0102228 | A1 | 4/2016 | Thatcher et al. |
| 2017/0313910 | A1 | 11/2017 | Bieber et al. |
| 2020/0123418 | A1 | 4/2020 | Kakuda et al. |

FOREIGN PATENT DOCUMENTS

| JP | 2000319603 A | 11/2000 |
| WO | 2014099098 A1 | 6/2014 |
| WO | 2015004311 A1 | 1/2015 |
| WO | 2018145257 A1 | 8/2018 |
| WO | 2018227038 A1 | 12/2018 |
| WO | 2019003964 A1 | 1/2019 |
| WO | WO-2019/210120 A1 * | 10/2019 |
| WO | 2020019146 A1 | 1/2020 |
| WO | 2020121278 A1 | 6/2020 |

OTHER PUBLICATIONS

International Preliminary Report on Patentability for the corresponding International Application No. PCT/FI2021/050391; Date of Completion: Sep. 23, 2022; 17 pages.

Written Opinion for the corresponding International Application No. PCT/FI2021/050391; Date of Mailing: May 18, 2022; 6 pages.

Anonymous: "Tackifier Products", Mar. 1, 2018 (Mar. 1, 2018), pp. 1-7, XP055919223, Retrieved from the Internet: URL:https://www.tri-iso.com/documents/Functional_Products_ Tackifier_Brochure.pdf [retrieved on May 9, 2022].

Written Opinion of the International Preliminary Examining Authority for the corresponding International Application No. PCT/FI2021/050392; International Filing Date: May 31, 2021; Date of Mailing: Aug. 22, 2022; 7 pages.

Second Chinese Office Action for the corresponding Application No. 202180041444.8, Date of Dispatch: Mar. 1, 2025; 20 pages.

\* cited by examiner

RECYCLABLE PLASTIC LABEL

CROSS-REFERENCE TO RELATED APPLICATIONS

This application is a National Stage application of PCT/FI2021/050391, filed May 31, 2021, which claims benefit of Finnish Application No. 20205574 filed on Jun. 3, 2020, both of which are incorporated by reference herein in their entirety.

TECHNICAL FIELD

This specification relates to a recyclable label and a label laminate for providing recyclable labels. In particular, the specification relates to a mechanically recyclable label and a label laminate for providing the same.

BACKGROUND

It is a general practice to apply a label to the surface of containers or other packages to provide decoration, identification and/or information, for example, on the contents of the container or other package. The use of polymer containers or packages has been increasing.

Packaging materials based on plastic materials, for example PE, are mechanically recyclable. Mechanical recyclability of a specific product is determined by the recyclability of the different components of a packaging and their combination in a specific recycling stream. Before being able to determine the recyclability of a specific packaging, the recyclability of each of the components needs to be assessed. Mechanical recycling places stricter demands on the contents of the recycling stream when compared to chemical recycling, which is a process wherein a polymer is broken to its original monomer form so that it can eventually be processed (re-polymerized) and remade into new materials. However, mechanical recycling process may be more efficient in terms of energy and chemicals consumption when compared to the chemical one.

It would be desirable to produce labels which may be mechanically recycled together with the packaging materials without compromising the quality of the recycled fraction. It may be rather straightforward to choose a label face/substrate material(s) that is/are compatible with the packaging material in terms of recyclability. However, incompatibility issues are most likely to be caused by the adhesive(s) that is/are used as a part of the label structure. Such adhesives may include the lamination adhesive for combining the substrate layers in a multilayer label structure into a single laminated face structure, or the pressure sensitive adhesive for providing the adhesion of mono- or multilayer label face material to the labelled item. The incompatibility issues may be more pronounced with the pressure sensitive adhesives as their formulation to achieve all desired properties such as anchorage, shear resistance, tack, peel strength etc. is complicated and requires several different components to be properly balanced with each other. Most of the adhesives used in labels cannot be washed away or otherwise removed before recycling, and thus they typically end up into the recycling process and may be responsible for lowering the quality of the recycled fraction.

SUMMARY

It is an aim of this specification to provide a mechanically recyclable label that does not compromise quality of the recycled fraction, in other words a label that shows recycling compatibility. Particularly, aim is to provide a label comprising an adhesive that does not compromise quality of the recycled fraction. Most importantly, the adhesive components are chosen such that they are chemically compatible with each other as well as with the packaging material.

According to an embodiment, a mechanically recyclable label comprising a face and an adhesive is provided. The face comprises ethylene containing polymer. The adhesive comprises pressure sensitive adhesive. The pressure sensitive adhesive comprises at least 15 wt. % of a base polymer, at least 25 wt. % of a tackifier and at least 10 wt. % of a plasticizer. The base polymer, the tackifier and the plasticizer are colourless and odourless. The base polymer is a styrene block copolymer. The mechanically recyclable label is mechanically recyclable with packaging material comprising ethylene containing polymer.

According to an embodiment, a label laminate for providing mechanically recyclable labels is provided. The label laminate comprises a face, an adhesive and a release liner. The face is adjoined to the release liner via the adhesive. The face comprises ethylene containing polymer and the adhesive comprises pressure sensitive adhesive. The pressure sensitive adhesive comprises at least 15 wt. % of a base polymer, at least 25 wt. % of a tackifier and at least 10 wt. % of a plasticizer. The base polymer, the tackifier and the plasticizer are colourless and odourless. The base polymer is a styrene block copolymer. The mechanically recyclable label is mechanically recyclable with packaging material comprising ethylene containing polymer.

According to an embodiment, a method for manufacturing a label laminate is provided. The method comprises the following steps of:
  arranging a substrate as a release liner or a face,
  coating the substrate with an adhesive, the adhesive comprising pressure sensitive adhesive, and
  laminating the release liner together with the face in such a way that the adhesive is arranged in between the face and the release liner.

The face comprises ethylene containing polymer and the pressure sensitive adhesive comprises at least 15 wt. % of a base polymer, at least 25 wt. % of a tackifier and at least 10 wt. % of a plasticizer. The base polymer, the tackifier and the plasticizer are colourless and odourless, and the base polymer is a styrene block copolymer.

According to an embodiment, a labelled item comprising an item and a mechanically recyclable label as described herein is provided. The mechanically recyclable label is attached to a surface of the item through the adhesive of the label.

According to an embodiment, use of a mechanically recyclable label described herein for labelling an item is provided.

According to an embodiment, use of a label laminate described herein for providing mechanically recyclable labels is provided.

According to an embodiment, use of a waste matrix of a label laminate disclosed herein for producing granulates of recycled plastic is provided. The waste matrix comprises a face and an adhesive.

According to an embodiment, a granulate of recycled plastic is provided. The granulate of recycled plastic comprises a waste matrix of a label laminate disclosed herein. The waste matrix comprises a face and an adhesive.

According to an embodiment, use of a granulate disclosed herein for providing a plastic item is provided.

According to an embodiment, a plastic item comprising a granulate of recycled plastic disclosed herein is provided.

BRIEF DESCRIPTION OF THE DRAWINGS

The figures are schematic. The figures are not in a particular scale.

DETAILED DESCRIPTION

The solution is described in the following in more detail with reference to some embodiments, which shall not be regarded as limiting.

In this description and claims, the percentage values relating to an amount of a material are percentages by weight (wt. %) unless otherwise indicated. Term "comprising" may be used as an open term, but it also comprises the closed term "consisting of". Unit of temperature expressed as degrees C. corresponds to ° C. Following reference numbers and denotations are used in this specification:

| | |
|---|---|
| DSC | differential scanning calorimetry |
| MRK1 | graphics |
| MW | molecular weight |
| PIB | polyisobutylene |
| Sx, Sy, Sz | 3D coordinates |
| 1 | a (mechanically recyclable) label |
| 2 | a face |
| 4 | an adhesive |
| 6 | a release liner |
| 8 | a label laminate |
| 10 | a backing material |
| 12 | a release layer |
| 100 | an item |
| 101 | a labelled item |
| 421 | a pre-treatment step |
| 422 | a heating and mixing step |
| 423 | a pelletizing step |

Within context of this description, term "polymer" includes both conventional homopolymers, that is, homogeneous polymers prepared from a single monomer, and copolymers, meaning polymers prepared by a reaction of at least two monomers or otherwise containing chemically differentiated segments or blocks therein even if formed from a single monomer.

A label is a piece of material to be applied onto articles of different shapes and materials. An article may be a package. A label comprises at least a face material also referred to as a face stock or a face. A typical way to adhere the label onto an article is by use of adhesive. The label comprising an adhesive layer is referred to as an adhesive label. The adhesive may comprise pressure sensitive adhesive (PSA). A label comprising pressure sensitive adhesive may be referred to as a pressure sensitive adhesive label. Pressure sensitive adhesive labels may also be referred to as self-adhesive labels.

The labels comprising PSA can be adhered to most surfaces through an adhesive layer without the use of a secondary agent, such as a solvent, or heat to strengthen the bond. The PSA forms a bond when pressure is applied onto the label at ambient temperature (e.g. between 15 and 35° C.) or for cold applications even under freezing temperatures below 0° C., adhering the label to the item to be labelled. Examples of pressure sensitive adhesives include water-based (water-borne) PSAs, solvent based PSAs and hot-melt PSAs. A label may further comprise other adhesive(s).

Face refers to a top substrate of the label, also called as a face stock or a face material. In case of a plastic face material it may also be called a face film. The face may have a monolayer or multilayer structure comprising at least two layers. These layers may be formed and combined together through a coextrusion process or the pre-existing layers may be laminated together into a multilayer structure using lamination adhesive or adhesives. The face is the layer that is adhered to the surface of an article during labelling through an adhesive layer, typically pressure sensitive adhesive layer. The face comprises an adhesive side and a print side. A combination comprising a face and an adhesive may be referred to as an adhesive label. The face may comprise e.g. print in order to provide information and/or visual effect. Printable face is suitable for printing by any of the known printing methods, such as with gravure, flexographic process, offset, screen or letter-press. The printing may exist on a top surface, reverse side or both top and reverse side of the face. Further, the label may contain additional layers, for example top coatings or overlaminates to protect the top surface and/or print of the label against rubbing or other external stress. Coating or additional layers, such as a primer, may enable enhancing compatibility of adjacent layers or parts of the label, for example adhesion between the layers. The primer may also act as a barrier preventing adhesive components from migrating into the face. A label comprising a face, a print layer and an adhesive may be referred to as a printed label.

Release liner refers to a structure comprising a substrate and a release layer on a surface of the substrate contacting the adhesive in a label laminate. The substrate may also be called a backing material. The release liner may comprise a release coating. The release coating may comprise a release agent, for example a silicone or non-silicone based agent. The release agent is a chemical having low surface tension. The release agent may be used in order to prevent other materials from bonding to it and to provide a release effect. The release coating provides a non-adherent surface i.e. low adhesion and release effect against the adhesive. Release liners of the label laminates may serve one or more useful functions: they may be used as a carrier sheet onto which the adhesive is coated; they may protect the adhesive layer during storage and transportation; they may provide a support for labels during die-cutting and printing, and ultimately they may provide the release substrate carrying the labels for dispensing onto the items to be labelled. Release liner allows for efficient handling of individual labels after the labels are die-cut and the surrounding matrix is stripped up to the point wherein the individual labels are dispensed on a labelling line. During dispensing the release liner is peeled off and discarded.

Label laminate, also referred to as an adhesive label laminate refers to a product comprising a mono- or multilayer face, adhesive and a release liner. In the label laminate the face is laminated together with the release liner having the adhesive in between, this adhesive typically being a pressure sensitive adhesive. The label face material may be itself a laminated structure with several face layers laminated together with lamination adhesive(s). The label laminate may be a continuous structure from which the individual labels may be die-cut. The release liner of the label laminate is typically removed prior to labelling i.e. attaching the label onto the surface of an item to be labelled.

The manufacturing process of label laminates and labels thereof typically comprises steps of providing a face stock and a release liner, applying an adhesive layer onto a surface of the face stock and/or onto a surface of the release liner and laminating the face stock with the release liner in such a way that the adhesive layer is arranged in between the face stock and the release liner in order to form a label laminate.

The label laminate may be converted, i.e. individual labels may be cut from the label laminate structure. After cutting, the labels may remain to be attached to a common release liner (i.e. the release liner remains uncut). Thus, a plurality of labels may remain to be attached to a common continuous release liner. This may be called a converted label web. Alternatively, the labels may be completely separate (i.e. also the release liner may be cut).

In the lamination process so-called machine rolls, the width of the rolls corresponding to the width of the manufacturing/laminating machine, are typically formed. The machine rolls may be slit, i.e. cut lengthwise to so-called customer rolls with smaller widths. The slitting involves typically unwinding the machine roll, then slitting the web and again winding the narrower webs into individual customer rolls. Alternatively, the slitting into customer rolls may be performed as a part of the label lamination process as an in-line process, or it may even be performed as part of the label laminate converting process, wherein the label laminate is die-cut (kiss cut) to form individual labels carried by continuous release liner.

The label may also be a so-called linerless label. The linerless label comprises a mono- or multilayer face and an adhesive on the face. Alternatively, the label may be a so-called shrink label, where heat shrinkable polymeric face material(s) are seamed and rolled on or sleeved around labelled articles and shrunk around the items. Shrinkable labels may comprise additionally some pressure sensitive adhesive(s) or those may be produced completely without pressure sensitive adhesive, or even without seaming adhesive.

Labels may be used in wide variety of labelling applications and end-use areas, such as labelling of food, home and personal care products, industrial products, pharmaceutical and health care products, beverage and wine bottles, other consumables etc. Labels enable providing information, like product specification, on the labelled product(s). Information, e.g. print of a label, may comprise human-readable information, like image(s), logo(s), text, and/or machine-readable information, like bar code(s), QR (Quick Response) code(s).

This specification aims to provide a label that is mechanically recyclable together with a packaging material the label has been adhered to. Aim is to provide a label that does not compromise quality of the recycled fraction. Particularly, aim is to provide a label comprising an adhesive that does not compromise quality of the recycled fraction. Most importantly, chemical compatibility of the adhesive components with each other as well as with the packaging material must be assured. Mixing chemically incompatible components may cause different phases to form, which may be visually detected by increased haze of the material.

Besides chemical compatibility, the label and thus also the adhesive therein must show recycling compatibility, meaning that they do not compromise quality of the recycled fraction. Quality of the recycled fraction may refer to odour, colour, processability, mechanical properties, and/or optical properties. "Not compromising the quality" means that the recycled plastic material is not substantially of lower quality in terms of, for example, odour, colour, processsability, mechanical properties and/or optical properties, when compared to recycled plastic material wherefrom the label (and the adhesive therein) has been removed before recycling. Thus, the label to be recycled should not cause lowering of the quality of the recycled plastic material.

Label Structure

Figure 1:
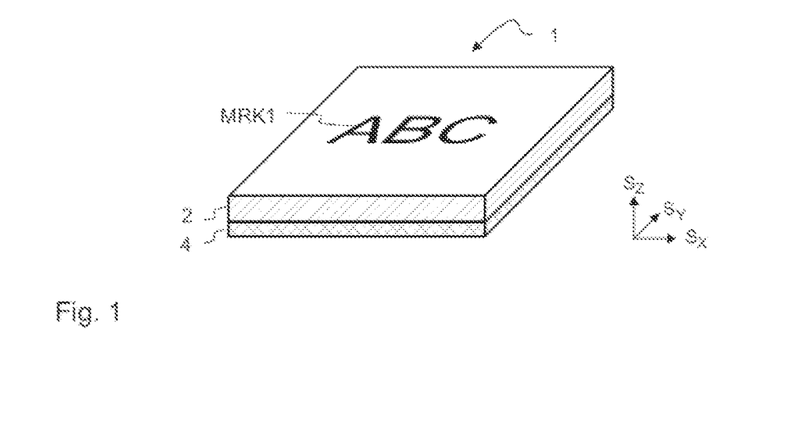
FIG. 1 illustrates, by way of an example, a 3D view of a label according to an embodiment.

Referring to FIG. 1 a label 1, within context of this specification a mechanically recyclable label, comprises a face 2 and an adhesive 4. The label is attachable to an item 100 through the adhesive 4. Further the label 1 typically includes graphical patterns (graphics) MRK1 on its face 2. During label manufacturing, continuous face 2 may be laminated together with a release liner 6 having the adhesive 4 in between so as to provide a label laminate 8 from which the individual labels 1 can be cut. Term "label laminate" 8, within context of this specification a label laminate for providing mechanically recyclable labels, refers to a continuous structure comprising a face 2, an adhesive 4 and a release liner 6. Individual labels 1 may be die-cut from the continuous label laminate 8. A label laminate 8 illustrated in FIG. 2 comprises four cut labels 1 attached to a common release liner 6. The release liner 6 has a backing material 10 coated with a release layer 12. During labelling the release liner 6 is removed and the label 1 is attached onto a surface to be labelled through the adhesive.

Figure 2:
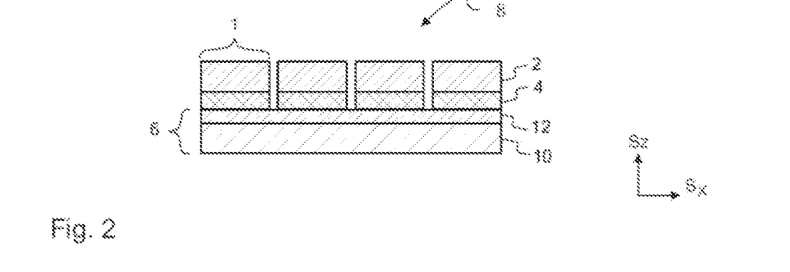
FIG. 2 illustrates, by way of an example, a cross sectional view of cut labels attached to a common release liner.

FIG. 2 presents an example embodiment of a label laminate 8 comprising four cut labels 1 attached to a common release liner 6. The label laminate structure may comprise a face 2, a release liner 6 and an adhesive 4. The adhesive 4 is arranged between a release layer 12 of the release liner 6 and the face 2. Referring to FIG. 1, the label structure may further comprise printing as graphics MRK1. A top surface of the face 2 may be printed. The printing may be subsequently top coated in order to protect the printing. Alternatively, or in addition, the reverse side of the face 2, adjacent to the adhesive 4, may be printed so that this print is visible through transparent adhesive layer 4 when release liner 6 is attached and label is not yet dispensed onto an article or is removed from the article. In some embodiments, the adhesive layer 4 may also be printable.

The label 1 may further comprise a primer layer. The primer layer may be arranged in between the face 2 and the adhesive 4.

Face

Within context of this specification, the face 2 comprises ethylene containing polymer. The ethylene containing polymer refers to a polymer that comprises ethylene as a monomer unit. The ethylene containing polymer may refer to polyethylene, copolymer containing ethylene, or polyethylene mixed with other polymer.

The face 2 may comprise polyethylene (PE). Polyethylene may also be called polyethene. The term "polyethylene" may include homopolymers of ethylene and copolymers of ethylene and one or more $C_{3-8}$ alpha-olefins. Copolymers of ethylene and one or more $C_{3-8}$ alpha-olefins may comprise at least 50 mol-% of ethylene. Polyethylene may be low density polyethylene (LDPE). LDPE may typically be defined by having a density of between 0.910-0.940 g/cm³. Polyethylene may be high density polyethylene (HDPE). HDPE may typically be defined by having a density of greater than or equal to 0.941 g/cm³. Medium density polyethylene (MDPE) may typically be defined having a density of between 0.926-0.940 g/cm³. Polyethylene may be linear low density polyethylene (LLDPE), ultra-low density polyethylene (ULDPE) or metallocene linear low density polyethylene (MLLDPE). Due to their characteristic manufacturing process, LLDPE and HDPE may in particular be utilized in oriented filmic materials.

The face 2 may be a single layer structure or it may comprise multiple layers, for example three layers. At least one, preferably all layers of the multiple layered face comprises ethylene containing polymer.

Adhesive

Figure 3:
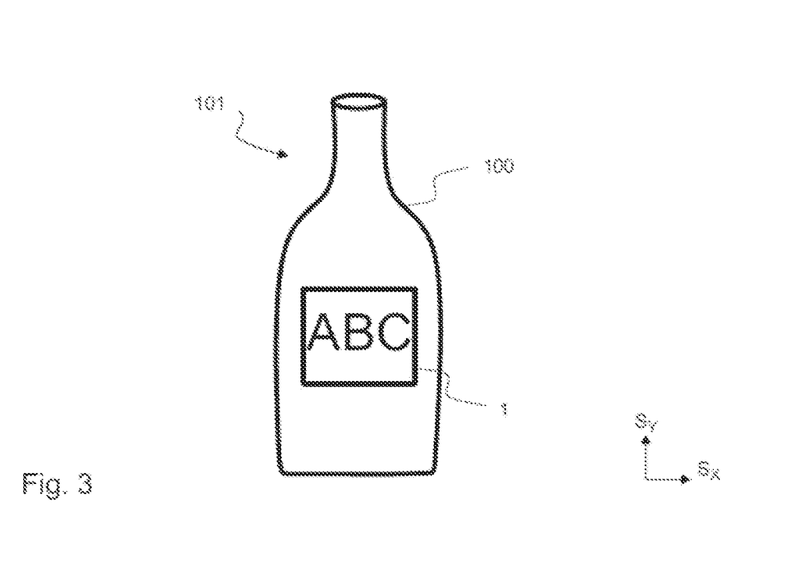
FIG. 3 illustrates, by way of an example, a label attached to an item.

A label 1 can be affixed to the surface of an item 100 through an adhesive 4 so as to form a labelled item 101, as illustrated in FIG. 3. Adhesive 4 provides adhesion, i.e. adheres or bonds the label 1 to the surface of the item 100. The adhesive 4 of the label 1 should have a suitable adhesion, i.e. tack (stickiness) in order to stick to an item 100 during labelling process. Tack is the property adhesive that allows the immediate formation of a bond on contact with another surface. Tackiness is needed at the point the label is attached to an item 100. The optimum adhesion between two materials depends on, for example, wetting and surface energy of the materials.

An adhesive 4 may be a continuous coating covering 100% of the face surface. Alternatively, it may be arranged discontinuously as spots or strips covering less than 100% of the face surface. This may be called "pattern gumming". For example, the adhesive may cover between 10 to 90% of the total area of the face 2. Reduced amount of adhesive may have effect on recyclability of the label, as incompatibility issues caused by the adhesive may be diminished by the smaller amount of the adhesive comprised by the label.

An adhesive 4 may have a thickness in the range of about 5-40 µm, or in the range of about 5-20 µm. For example, the thickness of the adhesive is in the range of about 10-20 µm or 15-20 µm. A coat weight of the adhesive, in dry weight, may be in the range of about 5-40 g/m², or 5-20 g/m². The coat weight of the adhesive may be preferably less than 25 g/m², or equal or less than 20 g/m². For example, the coat weight of the adhesive is between 10 and 20 g/m² or between 15 and 20 g/m².

As a rule of thumb, the adhesive coating thickness is related to the coat weight of the adhesive in such a way, that generally coat weight of 1 g/m² corresponds to coating thickness of ~1 µm or slightly less.

Herein, an adhesive 4 adjacent to the surface of the item labelled comprises a pressure sensitive adhesive(s) (PSA). PSA is a type of an adhesive which forms a bond when pressure is applied in order to bond the adhesive with an adherend. The adhesive may be pressure sensitive as such or it may be activatable in order to be pressure sensitive. An example is hot melt PSA, which typically comprises high-viscosity materials that may be heated to reduce viscosity enough in order to allow coating, and then cooled to their final form. Further examples include water-based and solvent-based adhesives. All of said adhesive categories may comprise the components described below.

Especially in shrink labels adhesive may be present solely on a leading and/or trailing edge of a label for adhering the label edges to the surface to be labelled.

In labels comprising a multi-layered face, adhesive may be present between the separate layers of the face for adhering the layers to each other.

Adhesive may be rubber-based. Rubber-based adhesives can either comprise synthetic rubber or natural rubber. Rubber-based adhesives typically contain at least one tackifier resin and/or one plasticizer because rubber is not usually fundamentally tacky. Rubber-based adhesives typically have good adhesion to non-polar substrates such as untreated polyethylene and polypropylene.

Adhesive may comprise thermoplastic elastomer, such as styrene block copolymer or polyolefin.

Adhesive may be styrene block copolymer-based. Styrene block copolymer-based means that the base polymer of the adhesive belongs to styrene block copolymers.

Adhesive may be polyolefin-based. Polyolefin-based means that the base polymer of the adhesive composition belongs to polyolefins. Polyolefin is a type of a polymer produced from a simple olefin, i.e. alkene with the general formula of $C_nH_{2n}$, as a monomer. Within context of this specification, suitable monomers of polyolefins comprise for example ethylene, propylene, 1-butene, octene, hexene. Polyolefin-based adhesive may comprise copolymer(s) of ethylene, propylene, 1-butene, octene, hexene. Polyolefins may be functionalized for example with oxygen containing monomer(s). Polyolefins may comprise one or more monomers.

Polyolefin may comprise a variety of monomers, including but not limited to ethylene, propylene, 1-butene, octene, hexene. Polyolefin may be for example amorphous (atactic) propylene (APP), propylene-ethylene copolymer, ethylene-octene copolymer, propylene-1-butene copolymer, propylene-hexene copolymer, propylene-ethylene-1-butene copolymer.

Polyolefins may be produced using Ziegler-Natta catalysis or metallocene, i.e. single-site, catalysis and may comprise a variety of monomers, including but not limited to propylene, ethylene, 1-butene, octene and hexene. Common thermoplastic polyolefin elastomers include for example amorphous (atactic) propylene (APP), propylene-ethylene copolymers, ethylene-octene copolymers, propylene-1-butene copolymers, propylene-hexene copolymers, propylene-ethylene-1-butene copolymers. Polyolefins produced by metallocene catalysis may have higher comonomer incorporation when compared to polymers produced by Ziegler-Natta catalysis. Examples of polymers suitable for polyolefin-based adhesive include for example Vestoplast®, Infuse®, Affinity® and Vistamaxx® polymers.

Tackifiers are compounds that may be used in adhesives for increasing tack, i.e. stickiness of the adhesive. Tackifiers are typically low molecular weight compounds, and their glass transition and softening temperatures are typically above room temperature. Tackifiers are typically chosen based on base polymer compatibility and desired properties of the end product. Tackifiers are typically resins, such as rosins and their derivatives, terpenes and modified terpenes, terpene-phenol resins, phenol resins, or hydrocarbon resins. Hydrocarbon resin (HC) may be partially hydrogenated or fully hydrogenated. Hydrocarbon resin may be aliphatic or aromatic resin. Hydrocarbon resin may be based on aliphatic HC comprising five carbons ($C_5$) and/or aromatic HC comprising nine carbons ($C_9$). Within context of this specification, hydrocarbon resin based on aliphatic HC comprising five carbons also includes dicyclopentadiene (DCPD). DCPD may dissociate to cyclopentadiene ($C_5$) monomer.

Plasticizers are compounds that may decrease plasticity or viscosity of a material. Plasticizers thus are substances that may be added in order to alter physical properties of the materials. Plasticizer may decrease the attraction between polymer chains in order to make them more flexible. Plasticizers are an important component of many adhesives. Plasticizers may lower the glass transition temperature and elastic modulus of an adhesive. Plasticizers are typically chosen based on base polymer compatibility and desired properties of the end product. By choosing a plasticizer that is compatible with the base polymer, the plasticizer may be protected for leaching out of the product and thus losing benefits of plasticization.

Besides the base polymer, tackifier and plasticizer the adhesive may comprise any conventional adhesive component(s), such as antioxidant(s), filler(s) and/or wax(es).

An important property for the adhesive of a recyclable label is that its components show chemical compatibility, in particular with each other but also with the packaging material to be recycled with. Chemical compatibility of the adhesive components ensure uniform phase structure, thus decreasing haze. Another important aspect is that the adhesive does not cause undesired odour or smell to the recycled material. Further, it should exhibit UV stability during shelf-life of the package. Also, it is of importance that the adhesive shows heat stability during the recycling process, and occurrence of burned particles and/or discoloration, or odour formation are avoided.

According to an embodiment, an adhesive for a recyclable label comprises a base polymer, a tackifier and a plasticizer. The adhesive is a pressure sensitive adhesive. The pressure sensitive adhesive may be a water-based adhesive, a solvent-based adhesive or a hot melt adhesive.

According to an embodiment, the pressure sensitive adhesive disclosed herein is a hot melt adhesive.

The adhesive components, i.e. the base polymer, the tackifier and the plasticizer are colourless and odourless. The adhesive components are colourless and odourless each of them separately as well as when combined in order to provide the adhesive. Further, the adhesive components are colourless and odourless during and after the recycling process. Within context of this specification colourless refers to a property of having no colour sensible to a human eye. Colourless may also comprise transparent or translucent features. Within context of this specification odour is caused by one or more volatilized chemical compounds, i.e. volatiles, that are found in concentrations that humans and animals can perceive by their sense of smell. Thus, odourless component refers to a component that does not comprise significant amount of volatiles. Term "volatile" refers to a substance that vaporizes readily. A volatile substance has a high vapor pressure at a given temperature compared with a non-volatile compound. The higher the vapor pressure of a compound, the more volatile it is. Higher vapor pressure and volatility translate into a lower boiling point. Increasing temperature increases vapor pressure, which is the pressure at which the gas phase is in equilibrium with the liquid or solid phase.

In order to obtain above described stability demands placed for the adhesive, the adhesive components should show stability. Thus, it is beneficial that the components comprise as low amount of reactive functional groups, such as double bonds, as possible. For example, adhesive components comprising reactive double bonds are prone to yellowing, thus causing undesired colour to the adhesive and/or to the recycled plastic material. Reactive adhesive components may also be prone to cause odour or smell when degraded/reacted.

The amount of base polymer in the adhesive is at least 15 wt. %. The amount of base polymer may be from 15 to 50 wt. %, preferably from 20 to 40 wt. %.

According to an embodiment, the base polymer is a styrene block copolymer. The styrene block copolymer may be at least one of the following: styrene and styrene-butadiene copolymer (SBS, SBR), styrene-isoprene copolymer (SIS), styrene-ethylene/butylene copolymer (SEBS), styrene-ethylene/propylene-styrene copolymer (SEPS) or styrene-isoprene-butylene copolymer (SIBS).

In order to increase the compatibility of the base polymer of the hot melt adhesive with packaging material comprising ethylene containing polymer in the recycled plastic material it may be beneficial that the base polymer contains ethylene. The base polymer may be a copolymer containing ethylene monomer(s).

SEBS (styrene-ethylene/butylene-styrene) has excellent resistance to water, acids and bases. SEBS is produced by partial and selective hydrogenation of SBS, which improves the thermal stability, weathering and oil resistance, and makes SEBS steam sterilisable. Thus, use of SEBS as the base polymer of the adhesive has the effect of improving the compatibility of the adhesive in pharmacological applications.

The amount of tackifier in the adhesive is at least 25 wt. %. The amount of tackifier may be from 25 to 60 wt. %, preferably from 40 to 50 wt. %.

According to an embodiment, the tackifier is partially or fully hydrogenated hydrocarbon resin. The hydrocarbon resin may be for example $C_5/C_9$ resin, $C_5$ resin, or $C_9$ resin.

The amount of plasticizer in the adhesive is at least 10 wt. %. The amount of plasticizer may be from 10 to 50 wt. %, preferably from 10 to 25 wt. % or from 20 to 50 wt. %.

The plasticizer may comprise an average molecular weight of at least 480 Da. Additionally or alternatively, the plasticizer may have a viscosity at 100 degrees C. of at least 8.5 cSt ($8.5 \times 10^{-6}$ $m^2/s$). Additionally or alternatively, the plasticizer may have a content of mineral hydrocarbons with a carbon number equal to or below 25 of not more than 5% (w/w). The plasticizer may be a mineral oil. The mineral oil may be derived from petroleum based hydrocarbon feedstocks. The mineral oils may comprise for example white oils, paraffinic oils, naphthenic oils. Other suitable plasticizers may comprise for example adipates, polypropylene oligomers, polybutene oligomers, polyisoprene oligomers, hydrogenated polyisoprene and/or polybutadiene oligomers, benzoate esters, vegetable or animal oils and their derivatives, sulfonic acid esters, mono or polyhydric alcohols, polyalkylene glycols having a molecular weight of from 200 to 6000 g/mol, such as polypropylene glycol or polybutylene glycol. The plasticizer component is preferably liquid at room temperature.

According to an embodiment, the hot melt adhesive comprises at least 15 wt. % of a base polymer, at least 25 wt. % of a tackifier and at least 10 wt. % of a plasticizer. The base polymer, the tackifier and the plasticizer are colourless and odourless. The base polymer is at least one of the following: styrene-isoprene-styrene (SIS), styrene-ethylene/butylene-styrene (SEBS), styrene-ethylene/propylene-styrene (SEPS). The tackifier is hydrogenated hydrocarbon. The plasticizer comprises a compound fulfilling at least one of the following: comprising an average molecular weight of at least 480 Da, having a viscosity at 100 degrees C. of at least $8.5 \times 10^{-6}$ $m^2/s$, having a content of mineral hydrocarbons with a carbon number equal to or below 25 of not more than 5% (w/w).

According to an embodiment, the base polymer of the hot melt adhesive is styrene-ethylene/butylene-styrene (SEBS).

According to an embodiment, the plasticizer is polyisobutylene (PIB).

According to an embodiment, the base polymer of the holt melt adhesive is SEBS, the plasticizer is PIB and the tackifier is hydrogenated hydrocarbon.

In an example, the hydrogenated hydrocarbon as a tackifier is cycloaliphatic hydrocarbon resin, for example dicyclopentadiene (DCPD).

Packaging Material

Within context of this specification the packaging material, i.e. the material of an item 100, comprises ethylene containing polymer. The ethylene containing polymer refers to a polymer that comprises ethylene as a monomer unit. The ethylene containing polymer may refer to polyethylene, a copolymer containing ethylene, or polyethylene mixed with other polymer. The package, i.e. the item 100, may be flexible or rigid. The package may be printed or nonprinted.

According to an embodiment the packaging material comprises HDPE.

According to an embodiment the packaging material comprises copolymer of propylene and ethylene.

According to an embodiment the package is a bottle. The bottle may be for example a bottle for a home care or personal care product. According to another embodiment the package is a flexible package.

Recycling Process

Figure 4:
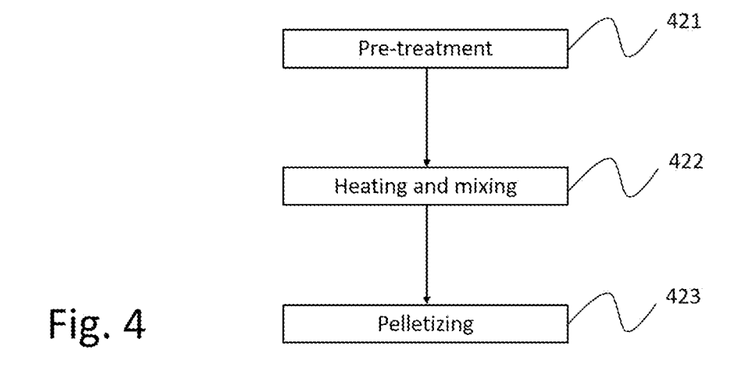
FIG. 4 illustrates, by way of an example, a mechanical recycling process for recycling of plastic.

Labels according to this disclosure are intended to be recycled mechanically. An exemplary mechanical recycling process is illustrated in FIG. 4. In a mechanical recycling process the labelled packaging may be first pre-treated. In the pre-treatment step 421 the labelled packaging may be exposed to a preliminary washing and/or sorting. The labelled packaging is typically shredded in the pre-treatment step. The following step, i.e. a mixing and heating step comprises heating and mixing of the (shredded) materials. The heated and mixed materials may be extruded in order to provide a melt stream. The melt stream may then be filtered and degassed. In the final, pelletizing step 423 the melt stream may be pelletized so as to produce recycled plastics as an output.

An apparatus for mechanical recycling typically comprises a feeding device for feeding the material to be recycled and a cutter-compactor for cutting, mixing, heating, drying, pre-compacting and buffering the material. After the cutter-compactor an extruder screw may be arranged for providing the melt stream. The extruder screw may comprise a filter, a homogenization zone, a degassing zone and a discharge zone. After the extruder screw, a pelletizer may be provided for producing pellets from the recycled material.

It is of importance that the label materials show stability in the recycling process. Thus, the recycling process itself may not cause unwanted properties to the recycled material. For example heat stability during the recycling process is needed in order to avoid burned particles and/or discoloration, or smell created by degradation that might compromise the quality of the recycled plastic.

It is also beneficial that the label materials are such that they do not contaminate the recycling apparatus.

Besides labels, also the so-called waste matrix obtained as a result of conversion of the labels disclosed herein can be recycled mechanically. Waste matrix refers to the material between and around each label. Thus, the waste matrix comprises the same components as the label, i.e. the face and the adhesive, as discussed above. The waste matrix is formed by die or kiss cutting the labels from the label laminate and may be stripped away subsequently, preferably immediately, after the cutting action as a continuous waste matrix skeleton. The waste matrix skeleton may also be called waste matrix web. Conventionally the waste matrix is reeled up and removed for disposal as solid waste or used as fuel. More sustainable alternatives for disposal as solid waste or for combusting have been studied.

Mechanical recycling and reuse of thus formed recycled plastic provides a sustainable approach for the waste matrix treatment. The recycled fraction comprising waste matrix may have an adhesive content of even up to 20 wt. %, for example 15 wt. %. The waste matrix having the face comprising ethylene containing polymer and the adhesive disclosed herein even at such high contents is suitable for recycling and for providing recycled plastic. The waste matrix may be recycled such that the recycled fraction consists of the waste matrix, i.e. there is no other material included besides the waste matrix to be recycled.

The recycled fraction comprising waste matrix may be treated as discussed above to produce granulates of recycled plastic. Granulates may also be called pellets. The produced granulates may be used for example for polyethylene extrusion. As the recycled fraction comprising waste matrix has higher adhesive content and comprises smaller molecules when compared to one comprising labelled packages, the mechanical properties of the products prepared from the granulates thereof may be somewhat weaker. However, the granulates of recycled plastic thus prepared may be mixed with ones having better properties, thus leading to recycled plastic with comparable mechanical properties. The amount of the granulates as well as the counterpart material may be tuned according to the application in question.

A circular economy approach towards waste elimination and continual use of resources is provided by mechanical recycling of the waste matrix disclosed herein as well as use of the recycled plastic thus formed.

Properties of the Recycled Material

As already mentioned, the label must not compromise quality of the recycled fraction. In particular, the adhesive of the label must not compromise quality of the recycled fraction. Quality of the recycled fraction may refer for example to odour, colour, processability, mechanical properties, and/or optical properties. It is important that the adhesive is compatible with other components of the recycled fraction. It may be estimated that the recycled plastic containing the label and the packaging material comprises at maximum 5% (by weight) adhesive.

Compatibility of the adhesive may be detected for example by visual aspects (such as haze, gloss and/or colour), microscopy analyses for phase structure and DSC analyses of the recycled plastic comprising the adhesive.

Figure 5:
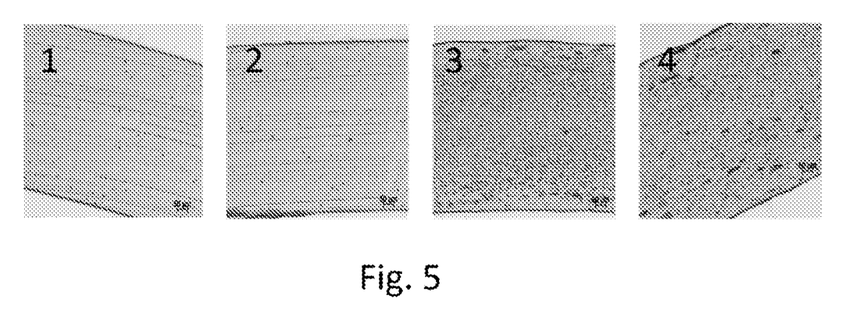
FIG. 5 illustrates optical microscopy images of test experiments showing compatibility of different types of commercially available adhesives with PE.
Figure 6:
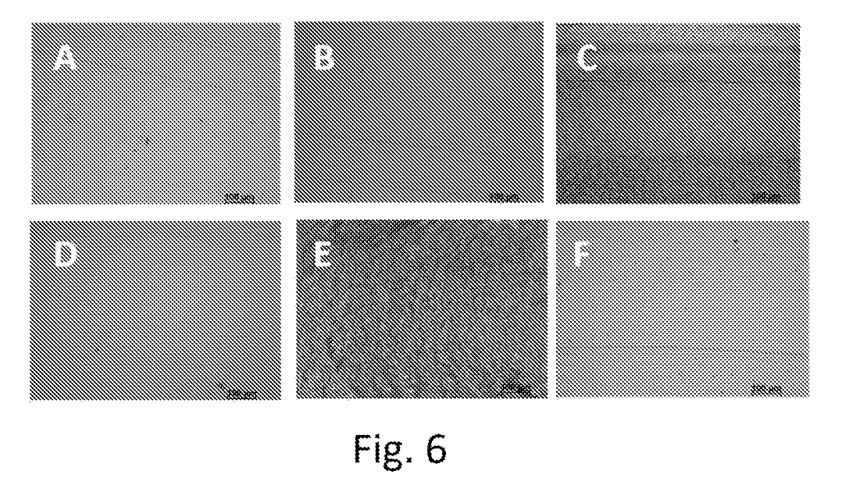
FIG. 6 illustrates optical microscopy images of test experiments showing compatibility of different components of hot melt adhesive with PE.

Morphology or phase structure of the recycled material may be inspected by microscopy, such as light microscopy or scanning electron microscopy (SEM). With a light microscope, i.e. optical microscope, changes in the morphology or phase structure of the material caused by incompatible components are clearly visible in film cross section samples prepared with a diamond knife, as illustrated in FIGS. 5 and 6 and discussed in the Test experiments section.

Colour of the recycled plastic may be determined using a so-called CIELAB colour space, which expresses colour as three values: L* for the lightness from black (0) to white (100), a* from green (−) to red (+), and b* from blue (−) to yellow (+). The colour values may be measured according to an ISO 5631 standard. The b* value describing the yellowness is relevant in determining quality of the recycled plastic. The higher the b*value, the yellower the sample is.

Haze is a property that is measured as the percentage of incident light scattered by more than 2.5° through a plastic sample. The lower the haze value, the higher the clarity. Impurities contained in the plastic material, inhomogenities as well as mechanical and chemical degradation are among the factors that may be responsible for light scattering and thus higher haze value. Incompatible components, i.e. components that do not show chemical compatibility and/or recycling compatibility, may cause different phases to form into the material. Haze arises from phases having difference in their refractive indexes causing scattering of light on the phase interfaces. Haze is tested according to a standard ASTM D1003. Haze of a sample may be measured with an instrument conforming to the requirements of ASTM D1003 Section 8: Procedure B Spectrophotometer.

Gloss is an important optical property associated with plastics surface and it is defined as the capacity of the polymer surface to reflect light in a given direction. Gloss characterizes how reflective or shiny a plastic material is, i.e. how much of a light beam touching the material with a defined incident angle is reflected vs. a standard material (a black specimen with a defined refractive index=100). A high gloss will produce a sharp image of any light source and thus will give rise to a pleasing sparkle on the surface. Materials having a high gloss are very smooth and highly reflective.

For the adhesive to be compatible with the components of the recycled fraction, the mechanical properties of the recycled plastic should not substantially deviate from the properties of a recycled plastic not containing the adhesive. The mechanical properties include for example elongation at break and tensile strength. Elongation at break, also known as fracture strain or tensile elongation at break, is related to ability of a plastic material sample to resist changes of shape without cracking. Elongation at break is a ratio between increased length and initial length after breakage of the tested sample at a controlled temperature. Tensile strength, for one, refers to a maximum stress that a material can withstand while being stretched or pulled before breaking. Tensile strength is a stress measured as force per unit area. Tensile strength may also be referred to as ultimate tensile strength, or ultimate strength.

Further, the processability of the recycled plastic should be comparable to the non-recycled plastic. The processability may for example relate to melt flow rate (MFR) or behaviour in film/bottle/container manufacturing. The processability of the recycled plastic refers to the processability for example in film extrusion, injection moulding etc. The melt flow rate is a measure of the ease of flow of the melt of a thermoplastic polymer.

Finally, it is of importance that the adhesive is compatible with other components of the recycled fraction such that it does not cause unwanted smell to the recycled plastic. On one hand the adhesive itself should not produce unwanted smell, i.e. the components should not contain significant amount of volatiles. On the other hand the adhesive should not be degraded during the recycling process and cause odour or smell.

Test Experiments

In the first experiment, compatibility of different types of commercially available adhesives with plastic packaging materials was investigated. As the material representing packaging material, a clear, one-layer blown film made of MDPE was used. The samples were prepared by adding 5% of different types of adhesives at a time to the MDPE polymer. An adhesive dosing of 5% (by weight) was chosen based on the hypothesis that said amount represents the maximum realistic total adhesive amount in packaging waste stream. A reference sample contained only MDPE, no adhesive. The samples thus prepared were exposed to a mechanical recycling process simulating the process described above. In the first step the materials were processed through a cylindrical extruder in order to compact/melt the different streams of adhesive and film to one material stream. The second step comprised grinding of the compacted test materials. In the third step a cast film having a thickness of 500-700 µm was casted using a small scale extruder. The properties of the films thus prepared were studied. On the basis of the experiments, hot melt adhesive was shown to be superior in compatibility with PE polymer to acrylate based adhesive. This is illustrated in FIG. 5 showing optical microscope images (100× magnification) of the samples prepared. The reference sample 1 containing only PE material as well as the sample 2 (PE+5% of a hot melt adhesive) are shown to consist of a uniform, nicely transparent phase. In images of samples 3 and 4 containing PE and 5% of two different acrylic adhesives the phase structure is shown to be far less uniform.

In the second experiment, compatibility of different components of hot melt adhesive with the packaging material was investigated. The aim was optimize the components in order to provide a hot melt adhesive that would be as compatible as possible with the PE packaging material. Results are illustrated in Table 1. As the material representing polyethylene packaging material HDPE pellets were used. The samples were prepared by adding 15% (by weight) of one adhesive component at a time to the HDPE polymer by a mini-compounder. Reference sample 1 contained no adhesive component. Reference samples 2 and 3 contained commercially available hot melt and acrylic adhesives, respectively. A coin having a diameter of 25 mm and thickness of 1 mm was injection moulded from the materials mixture and colour (b*value) and haze (%) of the coin samples were inspected. Colour and haze were measured by a Hunterlab Ultrascan VIS spectrophotometer. Colour values were measured using setting D65/10° simulating daylight conditions. Based on the experiments, a general rule may be derived, according to which a haze difference of 1%-unit is not visually observable, whereas a difference of 3%-units may be observed visually. Odour of the samples was also detected. Reference sample 2 (commercially available hot melt adhesive) and sample 2 (SBR) were detected to possess odour that was not satisfying the quality demands placed for recycled plastic material. Other samples were shown not to possess odour or were shown to possess only minor odour. Optical microscope images of certain samples are shown in FIG. 6. Image A illustrates reference sample 1 of Table 1, i.e. the HDPE polymer with no adhesive component. Image B illustrates sample 1 (HDPE+SIS), image C sample 2 (HDPE+SBR), image D sample 3 (HDPE+SEBS), image E sample 4 (HDPE+amorphous poly-alpha olefin) and image F sample 5 (HDPE+ethylene-octene copolymer), respectively. Images clearly show that addition of SIS, SEBS or ethylene-octene copolymer to HDPE has no significant effect on the phase structure. Thus, said components appear to be chemically compatible with HDPE. Addition of SBR or the amorphous poly-alpha olefin tested, for one, clearly show a difference in the phase structure when compared to reference HDPE material, thus indicating their chemical incompatibility with HDPE.

Base polymers SIS, SEBS and ethylene-octene copolymer (samples 1, 3 and 5, respectively), as well as tackifiers C5/C9 resin 2, partially hydrogenated (PH) C5/C9 resin and fully hydrogenated (FH) C5 resin (samples 7, 8 and 9, respectively) were, of the tested components, under the test conditions, shown to be the most compatible with HDPE. Of the tested components, all plasticizers were under the test conditions shown to be more or less compatible with HDPE. Plasticizers 13 and 14 showed a slight odour, whereas plasticizers 15, 16 and 17 in practice showed no odour.

TABLE 1

| Sample | Polymer | Type | Adhesive component | Colour | Haze |
|---|---|---|---|---|---|
| REF | HDPE | | | 6.03 | 94.80 |
| REF2 | HDPE | HM RH1S | Hot melt adhesive | 16.14 | 93.96 |
| REF3 | HDPE | WB RP37 | Acrylic adhesive | 14.76 | 97.52 |
| 1 | HDPE | Base polymer | SIS | 7.64 | 95.30 |
| 2 | HDPE | Base polymer | SBR | 9.97 | 94.40 |
| 3 | HDPE | Base polymer | SEBS | 6.52 | 94.66 |
| 4 | HDPE | Base polymer | Amorphous poly-alpha olefin | 8.96 | 97.54 |
| 5 | HDPE | Base polymer | ethylene-octene copolymer | 7.74 | 93.90 |
| 6 | HDPE | Tackifier | C5/C9 resin 1 | 10.89 | 95.18 |
| 7 | HDPE | Tackifier | C5/C9 resin 2 | 9.02 | 94.54 |
| 8 | HDPE | Tackifier | PH C5/C9 resin | 6.49 | 94.26 |
| 9 | HDPE | Tackifier | FH C5 resin | 6.08 | 94.22 |
| 10 | HDPE | Tackifier | C5 resin | 10.25 | 93.80 |
| 11 | HDPE | Tackifier | Rosin ester resin | 13.84 | 93.64 |
| 12 | HDPE | Tackifier | Hydrogen. rosin ester resin | 11.30 | 94.28 |
| 13 | HDPE | Plasticizer | Mineral oil | 5.76 | 92.30 |
| 14 | HDPE | Plasticizer | Low MW PIB | 6.31 | 91.04 |
| 15 | HDPE | Plasticizer | High MW PIB | 6.88 | 94.96 |
| 16 | HDPE | Plasticizer | Pharma oil | 7.55 | 92.14 |
| 17 | HDPE | Plasticizer | High MW pharma oil | 6.43 | 91.68 |

In the third experiment, compatibility of an unprinted label with an LDPE bottle in recycling was investigated. The label had a face comprising ethylene containing polymer. The adhesive of the label comprised SEBS as the base polymer, PIB as the plasticizer and hydrogenated hydrocarbon resin (cycloaliphatic hydrocarbon resin) as the tackifier. The LDPE bottle was compatible for use in the medical and healthcare field.

Tests were performed according to the Recyclability Evaluation Protocol for HDPE Containers, Version 1.0, authored by RecyClass.

The test material included natural white tubes, i.e. the LDPE bottles, with a height of 210 mm, a diameter of 56×75 mm and a filled weight of 570±10 g. The tubes were labelled with a natural white label of the size 105×76 mm and had a cap with a diameter of 35 mm and height of 15 mm.

Virgin LDPE granules were used as a control material.

The tests included the pre-treatment, extrusion and conversion (i.e. bottle production) of the material.

Bottles with the labels were grinded with a central granulator. The material was obtained as flakes with irregular shapes having a size distribution with dimensions ranging from 0.5 to 8 mm. The grinded material was elutriated with air to remove the light fraction. An air flow of 21.0 m³/h and a feed rate of 5.0 (machine-specific value) resulted in a throughput of 8.3 kg/h and a weight loss of 1.6%.

The heavy fraction was washed according to Procedure 1 of the Recyclability Evaluation Protocol (i.e. the cold wash procedure). The washing process included neither detergents nor soda. The material was washed for 5 min at a 1:4 ratio of flakes to tap water (11 kg flakes vs. 45 L water) at a temperature of 40±2° C. and at a stirring speed of 1000 rpm.

The wash was filtered with a strainer and rinsed with cold running tap water for 5 min under vigorously stirring with a manual stirring bar. The wash water and the rinse water were both colourless and clear. The washed material consisted of white and natural white flakes, and had a weight of 13.6 kg at a water content of 20.6%.

The washed material was subjected to a floatation process. A 1:6 mixture of flakes to water was prepared. The mixture was stirred at 500 rpm for 2 min. After 2 additional minutes without stirring the floating fraction was removed with a sieve (mesh size 1 mm). The material consisted of natural white flakes. There was no sinking fraction. The water used for the floatation remained clear and colourless.

The floating fraction of the material was dried without the application of vacuum or heat in a room with forced air ventilation at 25° C. and 50% relative humidity. The moisture content was determined with a moisture analyzer and was shown to be 0.10% after drying.

The dried material was elutriated with air to remove the light fraction. An air flow of 23.0 m³/h and a feed rate of 5.0 (machine-specific value) resulted in a throughput of 8.9 kg/h and a weight loss of 1.5%. The light fraction was made up from small flakes and splinters, whereas the heavy fraction contained bigger particles. The remaining material were natural white flakes.

The material thus prepared was manually mixed with the control material in order to prepare blends for pellet production. Blend A.0 contained 100% control material. Blend A.25 contained 25% test material and 75% control material. Blend A.50 contained 50% test material and 50% control material.

Each blend was extruded for 30 minutes at 220° C. All melt filters were white without any residues. The delta pressures for A.25 and A.50 were lower than for A.0. The prepared granulates were natural white and did not show any sign of thermal degradation. The material properties (i.e. ash content, melt index, moisture, impurities, surface appearance, volatile content, PP content and delta pressure) were within the recommended benchmarks. Melting points of A.0, A.25 and A.50 are below the recommended benchmark of 130-140° C. The bulk density of A.0 and A.25 are also below the recommended benchmark of >550 kg/m³. The densities of A.25 and A.50 also did not meet this criteria (±10 vs. A.0 928 kg/m³). Summary of pellet properties is shown in Table 2.

TABLE 2

| | Benchmark recommendation | A.0 | A.25 | A.50 |
|---|---|---|---|---|
| Bulk density [kg/m3] | >550 | 544 | 544 | 566 |
| Density [kg/m3] | ±10 for A.25 and A.50 vs. A.0; <995 (A.50) | 928 | 916 −12 vs. A.0 | 915 −13 vs. A.0 |
| Melt index [g/10 min] | 0.2-0.9 | 0.61 | 0.44 | 0.52 |
| Ash content [wt. %] | <2 (A.50) | — | — | 0 |
| Reflection colour L* | | 69.08 | 69.28 | 67.83 |
| a* | | −1.36 | −1.4 | −1.34 |
| b* | | −6.88 | −5.26 | −4.61 |
| Filtration | No build-up | ok | ok | ok |
| Moisture [wt. %] | — | 0.09 | 0.07 | 0.08 |
| DSC [° C.] | 130-140 | 118 | 118 | 117 |
| Impurities | — | ok | ok | ok |
| Surface appearance | — | ok | ok | ok |
| Volatiles [wt. %] | ±0.1% for A.25 and A.50 vs. A.0 | 0.14 | 0.17 | 0.16 |
| PP content [wt. %] | <2 for A.25 and A.50 | 0 | 0 | 0 |

TABLE 2-continued

|  | Benchmark recommendation | A.0 | A.25 | A.50 |
|---|---|---|---|---|
| Delta pressure [MPa] | <10% for A.25 and A.50 vs. A0 | 4.8 | 4.7 | 4.6 |
| Extrusion process | — | ok | ok | ok |

For the bottle production, the blends B.0, B.25 and B.50 were prepared by mixing A.0, A.25 and A.50 with the control material. The blends contained the test material in concentrations of 0.0, 12.5 and 25.0%. Each blend was blow moulded under identical process conditions into 1 L bottles with a rectangular cross section. No depositions were found on the tool. All bottles were intact.

Their dimensions, weights, capacities, thicknesses, crushing yield loads and mean failure heights in drop impact test were within the recommended benchmarks. In tensile tests, the samples showed a very similar behaviour.

Summaries of bottle properties as well as the tensile properties are shown in Tables 3 and 4, respectively.

TABLE 3

|  | Benchmark recommendation | B.0 | B.25 | B.50 |
|---|---|---|---|---|
| Bottle appearance | — | natural white | natural white | natural white |
| Bottle integrity | — | ok | ok | ok |
| Reflection colour | L* | 72.88 | 72.81 | 72.90 |
|  | a* | −0.76 | −0.88 | −0.84 |
|  | b* | −6.30 | −5.79 | −5.88 |
| Bottle dimension (height) in mm | ±5% vs. B.0 | 241.80 | ±0% | +0.05% |
| Bottle weight in g | ±5% vs. B.0 | 52.51 | +0.36% | +1.70% |
| Bottle capacity in g | ±5% vs. B.0 | 1255.88 | +0.38% | −4.11% |
| Thickness (top side wall) in mm | ≥0.3 mm | ok | ok | ok |
| Thickness (mid side wall) in mm | ≥0.3 mm | ok | ok | ok |
| Thickness (bottom side wall) in mm | ≥0.3 mm | ok | ok | ok |
| Thickness (shoulder) in mm | ≥0.3 mm | ok | ok | ok |
| Thickness (base corner) in mm | ≥0.3 mm | ok | ok | ok |
| Top load in kg | <5% decrease vs. B.0 | 5.40 | −3.65% | +0.19% |
| Drop impact in m | >95% vs. B.0 | 2.75 | +2.55% | +2.18% |
| Additional observations | No more than for B.0 | ok | ok | ok |

TABLE 4

|  | Standard | B.0 | B.25 | B.50 |
|---|---|---|---|---|
| Stress at yield [MPa] | ISO 527-2 | 13.0 ± 0.5 | 13.4 ± 0.5 | 13.2 ± 0.2 |
| Stress at break [MPa] | ISO 527-2 | —[a] | —[a] | —[a] |
| Elongation at yield [%] | ISO 527-2 | 20.5 ± 1.4 | 20.1 ± 1.5 | 20.1 ± 0.7 |
| Elongation at break [%] | ISO 527-2 | —[a] | —[a] | —[a] |
| Strength [MPa] | ISO 527-2 | 13.0 ± 0.5 | 13.4 ± 0.5 | 13.2 ± 0.2 |
| Elongation at Strength [%] | ISO 527-2 | 20.5 ± 1.4 | 20.1 ± 1.5 | 20.1 ± 0.7 |

[a]Samples did not break.

The third experiment discussed above shows that the label disclosed herein is mechanically recyclable with the packaging material in a way that does not compromise quality of the recycled fraction. Results obtained for the test material (A.25, A.50, B.25 and B.50) are very well comparable with the virgin LDPE as the control material.

The invention claimed is:

1. A mechanically recyclable label (1) for mechanical recycling with packaging material the label has been adhered to, the packaging material comprising ethylene containing polymer; the mechanically recyclable label (1) comprising a face (2) and an adhesive (4), wherein the face (2) comprises ethylene containing polymer and the adhesive (4) comprises pressure sensitive adhesive, the pressure sensitive adhesive comprising
   at least 15 wt. % of a base polymer,
   at least 25 wt. % of a tackifier and
   at least 10 wt. % of a plasticizer,
   wherein the base polymer is styrene-ethylene/butylene-styrene (SEBS), the tackifier is a hydrogenated hydrocarbon resin and the plasticizer is polyisobutylene.

2. The mechanically recyclable label (1) according to claim 1, wherein the plasticizer comprises a compound fulfilling at least one of the following:
   comprising an average molecular weight of at least 480 Da,
   having a viscosity at 100 degrees C. of at least $8.5 \times 10^{-6}$ m²/s,
   having a content of mineral hydrocarbons with a carbon number equal to or below 25 of not more than 5% (w/w).

3. The mechanically recyclable label (1) according to claim 1, wherein the label (1) is mechanically recyclable in a process comprising ethylene containing polymer and at most 5 wt. % of pressure sensitive adhesive, the process being arranged to provide recycled plastic material.

4. The mechanically recyclable label (1) according to claim 1, wherein
   the tackifier is at least one of the following: $C_5/C_9$ resin, $C_5$ resin, $C_9$ resin.

5. A label laminate (8) for providing mechanically recyclable labels (1) for mechanical recycling with packaging material the label has been adhered to, the packaging material comprising ethylene containing polymer, the label laminate (8) comprising a face (2), an adhesive (4) and a release liner (6), the face (2) being adjoined to the release liner (6) via the adhesive (4), the face (2) comprising ethylene containing polymer and the adhesive (4) comprising pressure sensitive adhesive, the pressure sensitive adhesive comprising
   at least 15 wt. % of a base polymer,
   at least 25 wt. % of a tackifier and
   at least 10 wt. % of a plasticizer,
and wherein the base polymer is styrene-ethylene/butylene-styrene (SEBS), the plasticizer is polyisobutylene (PIB) and the tackifier is hydrogenated hydrocarbon resin.

6. The label laminate (8) according to claim 5, wherein the plasticizer comprises a compound fulfilling at least one of the following:
  comprising an average molecular weight of at least 480 Da,
  having a viscosity at 100 degrees C. of at least $8.5 \times 10^{-6}$ m²/s,
  having a content of mineral hydrocarbons with a carbon number equal to or below 25 of not more than 5% (w/w).

7. The label laminate (8) according to claim 5, wherein the tackifier is at least one of the following: $C_5/C_9$ resin, $C_5$ resin, $C_9$ resin.

8. A method for manufacturing a label laminate (8) according to claim 5, the method comprising the following steps of:
  arranging a substrate as a release liner (6) or a face (2),
  coating the substrate with an adhesive (4), the adhesive (4) comprising pressure sensitive adhesive, and
  laminating the release liner (6) together with the face (2) in such a way that the adhesive (4) is arranged in between the face (2) and the release liner (6), wherein the face (2) comprises ethylene containing polymer and the pressure sensitive adhesive comprises at least 15 wt. % of a base polymer, at least 25 wt. % of a tackifier and at least 10 wt. % of a plasticizer, and wherein the base polymer is styrene-ethylene/butylene-styrene (SEBS), the plasticizer is polyisobutylene (PIB) and the tackifier is hydrogenated hydrocarbon resin.

9. A labelled item (101) comprising an item (100) and a mechanically recyclable label (1) according to claim 1, wherein the mechanically recyclable label (1) is attached to a surface of the item (100) through the adhesive (4) of the label (1), the material of the item comprises ethylene containing polymer, and the labelled item is mechanically recyclable.

10. A granulate of recycled plastic, comprising a waste matrix of a label laminate (8) according to claim 5, wherein the waste matrix comprises a face (2) and an adhesive (4).

11. A plastic item comprising a granulate of recycled plastic according to claim 10.

* * * * *